(12) United States Patent
Lewis et al.

(10) Patent No.: US 7,436,848 B1
(45) Date of Patent: Oct. 14, 2008

(54) METHOD FOR MOBILE NODE REGISTRATION MANAGEMENT

(75) Inventors: Ronald E. Lewis, Independence, MO (US); Arun Santharam, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1181 days.

(21) Appl. No.: 10/197,136

(22) Filed: Jul. 17, 2002

(51) Int. Cl.
*H04J 3/02* (2006.01)

(52) U.S. Cl. ..................... 370/462; 455/435.1

(58) Field of Classification Search .......... 370/462, 370/232–234, 328, 329; 455/435.1
See application file for complete search history.

(56) References Cited

U.S. PATENT DOCUMENTS

| | | | |
|---|---|---|---|
| 5,519,706 A * | 5/1996 | Bantz et al. | 455/435.2 |
| 6,201,967 B1 | 3/2001 | Goerke | |
| 6,230,012 B1 | 5/2001 | Willkie et al. | |
| 6,285,882 B1 | 9/2001 | Cornillat et al. | |
| 2001/0010717 A1 * | 8/2001 | Goto et al. | 379/127.01 |
| 2002/0191562 A1 * | 12/2002 | Kumaki et al. | 370/331 |
| 2003/0119506 A1 | 6/2003 | Singhai et al. | |
| 2004/0048618 A1 * | 3/2004 | O'neill et al. | 455/445 |
| 2006/0039285 A1 * | 2/2006 | Chapman et al. | 370/235 |
| 2006/0114859 A1 * | 6/2006 | Sudo et al. | 370/335 |

FOREIGN PATENT DOCUMENTS

WO   WO 00/44183 A2   7/2000

OTHER PUBLICATIONS

C. Perkins, et al., "IP Mobility Support", RFC 2002, pp. 1-56, Oct. 1996.
P. Calhoun, et al., "Mobile IP Network Access Identifier Extension for Ipv4," RFC 2794, pp. 1-7, Mar. 2000.

* cited by examiner

*Primary Examiner*—Hassan Kizou
*Assistant Examiner*—Bo Hui A Zhu

(57) ABSTRACT

A mobile node registers with a wireless telecommunications network to obtain a mobile node registration having a registration time period. Before the registration time period expires, the mobile node's registration is renewed, if a renewal criterion is met. The renewal criterion distinguishes between user data traffic and automatic data traffic.

5 Claims, 3 Drawing Sheets

METHOD FOR MOBILE NODE REGISTRATION MANAGEMENT

BACKGROUND

1. Field of the Invention

The present invention relates to telecommunications and, more particularly, to methods for managing mobile node registrations and resource allocations.

2. Description of Related Art

Wireless telecommunications technologies are continuing to develop in order to provide enhanced multimedia (e.g., data) service to wireless customers. For example, a wireless telecommunications network may allow wireless customers to access the Internet, browse the World Wide Web, send and receive e-mails, and access other packet data services.

To access these packet data services, wireless customers may use mobile nodes, such as wireless telephones, wireless personal digital assistants (PDAs), and wirelessly-equipped laptop computers, that use various protocols to connect to the wireless telecommunications network. For example, a mobile node may use the Point-To-Point (PPP) protocol and either Simple IP or Mobile IP protocol to establish a data link with the wireless telecommunications network. Once a mobile node has established a data link with the wireless telecommunications network, it may use higher-level protocols, such as the Session Initial Protocol (SIP) and the Wireless Application Protocol (WAP) to access packet data services.

In establishing a data link with a mobile node, the wireless telecommunications network may allocate a network resource for that mobile node. For example, the wireless telecommunications network may dynamically assign an IP address for the mobile node, for either a Mobile IP or a Simple IP session. Because network resources, such as dynamic IP addresses, that the wireless telecommunications network has available to allocate to mobile nodes may be limited, it is often desirable to carefully manage these network resources. As a result, resources, such as dynamic IP addresses, are often allocated to mobile nodes for only limited time periods. If a mobile node maintains a sufficient level of activity during the time period, then the mobile node may be able to renew its resource allocation. Otherwise, the wireless telecommunications network may de-allocate the mobile node's network resources, so that the resources can be made available to other mobile nodes.

The activity that determines whether resources can be renewed is often measured as the amount of the mobile node's data traffic, i.e., the amount of data it transmits and receives. However, only some of the data traffic may relate to user activity, e.g., data traffic initiated by user activity. A mobile node may also generate data traffic automatically, as a result of applications provided in the mobile node. This automatic data traffic occurs regardless of whether the user is actively using the mobile node.

For example, when a mobile node successfully registers with a wireless telecommunications network using Mobile IP, the mobile node obtains a mobile node registration, which may include a dynamically assigned Mobile IP address. The mobile node registration is typically valid for only a registration time period. In an existing implementation, the mobile node attempts to renew the registration by attempting to re-register before the expiration of the registration time period, if there has been any data traffic during the registration time period.

If, however, the mobile node runs applications that generate automatic data traffic, there may always be data traffic during the registration time period, even if the user does nothing. Accordingly, the mobile node may continue to renew its mobile node registrations, and continue to use up an IP address, until the user logs off, switches off the mobile node, or moves out of range. This may lead to the inefficient result of the wireless telecommunications network maintaining an IP address for the mobile node even though the user is inactive.

Accordingly, there is a need to provide more efficient management of mobile node registrations and resource allocations.

SUMMARY

In a first principal aspect, the present invention provides a method of registration management for a mobile node. The mobile node transmits and receives data traffic, including automatic data traffic and user data traffic. In accordance with the method, the mobile node is registered with a wireless telecommunications network to obtain a mobile node registration having a registration time period. A renewal criterion that tends to distinguish between user data traffic and automatic data traffic is provided, and the mobile node registration is renewed if the renewal criterion is met.

In a second principal aspect, the present invention provides a method of resource management for a mobile node in communication with a wireless telecommunications network. The mobile node transmits and receives data traffic, including automatic data traffic and user data traffic. In accordance with the method, a resource of said wireless telecommunications network is allocated to the mobile node for a resource allocation time period. A renewal criterion that tends to distinguish between user data traffic and automatic data traffic is provided, and the resource is re-allocated to the mobile node if said renewal criterion is met.

In a third principal aspect, the present invention provides a method of registration management for a mobile node that transmits and receives data traffic. In accordance with the method, the mobile node is registered with a wireless telecommunications network to obtain a mobile node registration having a registration time period. A data traffic amount is obtained by determining how much data traffic, exclusive of data traffic satisfying at least one exclusion criterion, occurred within a predetermined time period. The mobile node registration is renewed if the data traffic amount is at least a predetermined amount.

DETAILED DESCRIPTION OF EXEMPLARY EMBODIMENTS

1. Exemplary Architecture

Figure 1:
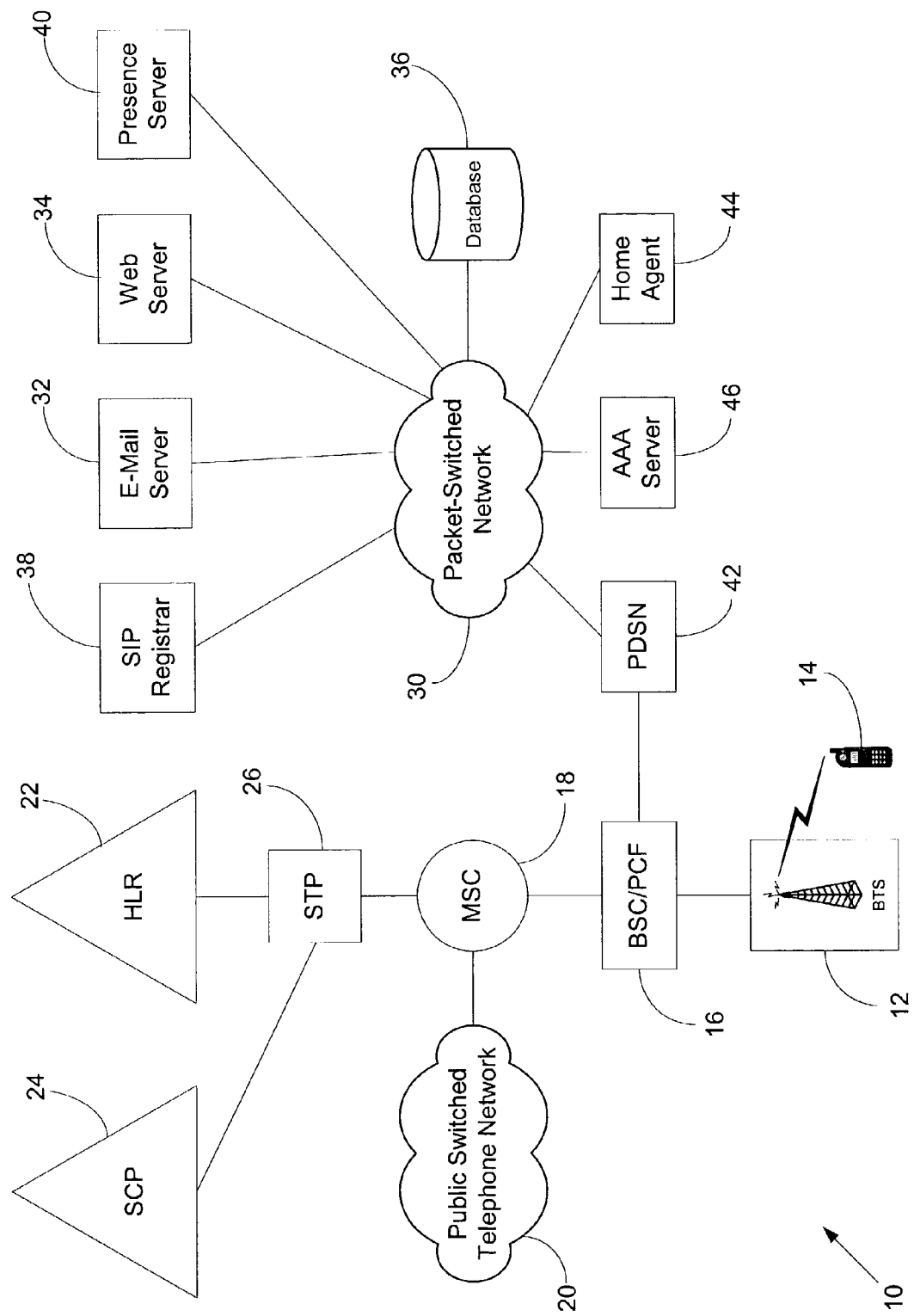
FIG. 1 is a simplified block diagram of a wireless telecommunications system, in accordance with an exemplary embodiment of the present invention.

Referring to the drawings, FIG. 1 is a simplified block diagram of an exemplary wireless telecommunications system 10 in which exemplary embodiments of the present invention may be employed. Wireless telecommunications system 10 includes a base transceiver station (BTS) 12 that provides a wireless coverage area within which BTS 12 may communicate with one or mobile nodes, such as mobile node 14, over an air interface. Mobile node 14 may be a wireless telephone, a personal digital assistant (PDA), a equipped laptop computer, or other mobile device. The communications between BTS 12 and mobile node 14 may occur in a digital format, such as CDMA, TDMA, GSM, or 802.11x, or they may occur in an analog format, such as AMPS. A preferred wireless communications format is "CDMA 2000," such as described in EIA/TIA/IS-2000 Series, Rev. A (published March 2000), which is incorporated herein by reference.

BTS 12 is controlled by a base station controller (BSC) 16, which, in turn, is controlled by a serving mobile switching center (MSC) 18. Serving MSC 18 is connected to the public switched telephone network (PSTN) 20. Serving MSC 18 is also able to signal to a home location register (HLR) 22 of mobile node 14 and to a service control point (SCP) 24. This signaling may occur via one or more signal transfer points (STPs), such as STP 26. Although FIG. 1 shows MSC 18 connected to one BSC and shows BSC 16 connected to one BTS, in general, MSC 18 may be connected to more than one BSC and each BSC, such as BSC 16, may be connected to more than one BTS.

MSC 18 may use a signaling system, such as SS7, to route calls through PSTN 20. The signaling between MSC 18 and HLR 22 may conform to IS-41 specifications. A recent revision of the IS-41 specifications, ANSI-41 Rev. D, published in July 1997, is incorporated herein by reference. The signaling between MSC 18 and SCP 24 may conform to the specification "Wireless Intelligent Network," TLA/EIA/IS-771, published in July 1999, which is incorporated herein by reference. Other signaling protocols could be used, however. In this way, MSC 18, BSC 16, and BTS 12 may connect incoming calls from PSTN 20, which calls may originate from calling parties using landline telephones, mobile stations, or other communication devices, to mobile node 14. Similarly, serving MSC 18, BSC 16, and BTS 12 may connect calls originating from mobile node 14 to their destinations, via PSTN 20.

Mobile node 14 may also be able to access packet-based services via a packet-switched network 30, such as the Internet. Such packet-based services may include e-mail, web browsing, instant messaging, and "push-to-talk" teleconferencing, for example. Thus, an e-mail server 32 and a web server 34 may be connected to packet-switched network 30 to provide e-mail and web browsing services, respectively, to mobile nodes, such as mobile node 14. Various databases, exemplified by database 36, may also be connected to packet-switched network 30 with which mobile nodes, such as mobile node 14, may be able to synchronize. Database 36 may contain address books, "buddy lists" for instant messaging, or other files with which mobile nodes, such as mobile node 14, may be able to synchronize.

Many other types of servers may also be connected to packet-switched network 30. For example, communications sessions through packet-switched network 30 may by initiated using the Session Initiation Protocol (SIP). Accordingly, one or more SIP servers, such as SIP registrar 38, may be connected to packet-switched network 30. Relevant aspects of SIP are described in M. Handley, et al., "SIP: Session Initiation Protocol," Request For Comments 2543 (March 1999), which is incorporated herein by reference.

A presence server 40 may also be connected to packet-switched network 30. Presence server 40 keeps track of the network presence of mobile nodes, such as mobile node 14. Presence server 40 may be consulted by applications, such as instant messaging applications, that can make use of network presence information.

To provide access to packet-switched network 30, BSC 16 may include a packet control function (PCF), and a packet data serving node (PDSN) 42 may connect BSC/PCF 16 to packet-switched network 30. The communications between BSC/PCF 16, MSC 18, and PDSN 42 may conform to "third generation" (3G) specifications. Examples of such 3G specifications include "Wireless IP Network Standard," 3GPP2 P.S0001-A, dated Jul. 16, 2001 and "3GPP2 Access Network Interfaces Interoperability Specification," 3GPP2 A.S0001-A, dated June 2001, which are incorporated herein by reference. Briefly stated, under these 3G specifications, when mobile node 14 requests packet data service, BSC/PCF 16 may engage in signaling with MSC 18 and with PDSN 42 to authenticate and authorize mobile node 14 and to set up a data link with PDSN 42. If this process is successful, a point-to-point protocol (PPP) session is established between mobile node 14 and PDSN 42. PDSN 42 then acts as a network access server, providing mobile node 14 access to packet-switched network 30.

If mobile node 14 uses Simple IP, PDSN 42 may also dynamically assign an Internet Protocol (IP) address to mobile node 14. Alternatively, mobile node 14 may use Mobile IP, in which case mobile node 14 sends a registration request, via PDSN 42, to a home agent 44. If home agent 44 approves the registration request, home agent 44 may dynamically assign mobile node 14 an IP address, or mobile node 14 may use an IP address permanently assigned to it. Relevant aspects of Mobile IP are described in C. Perkins, "IP Mobility Support," Request for Comments 2002 (October 1996) and P. Calhoun and C. Perkins, "Mobile IP Network Access Identifier Extension for Ipv4," Request for Comments 2794 (March 2000), which are incorporated herein by reference.

PDSN 42 may also exchange messages with an authentication, authorization, and accounting (AAA) server 46 via packet-switched network 30. This communication may conform to the RADIUS protocols specified in "Remote Authentication Dial In User Service (RADIUS)," Request For Comments 2138 (April 1997) and "RADIUS Accounting," Request For Comments 2139 (April 1997), which are incorporated herein by reference. Alternatively, the communications with AAA server 46 may conform to the DIAMETER protocol specified in Calhoun, et al., "Diameter Base Protocol," Internet-Draft (June 2002), or to some other protocol.

PDSN 42 may query AAA server 46 to authenticate and authorize requests by mobile nodes, such as mobile node 14, for access to packet-switched network 30. BSC/PCF 18 may also send to PDSN 42, and PDSN 42 may send to AAA server 46, status messages when BSC/PCF 18 starts and stops delivering packet data services to mobile node 14. For example, BSC/PCF 18 may generate a RADIUS accounting START message when BSC/PCF 18 begins transmitting data to or receiving data from mobile node 14. When the data session of mobile node 14 becomes dormant, which occurs when no data traffic involving mobile node 14 occurs for a certain period of time, such as ten seconds, then BSC/PCF 18 may generate a RADIUS accounting STOP message. The STOP message may include a count of the number of data bytes transmitted to mobile node 14 and a count of the number of data bytes received from mobile node 14.

Although mobile node 14 is shown in FIG. 1 in communication with BTS 12 over an air interface, mobile node 14 may also be able to communicate over wired connections. Indeed, mobile node 14 may not be equipped for wireless communication at all and may only communicate over wired connections. In addition, although mobile node 14 may be a wireless telephone or other device that is able to access PSTN 20, mobile node 14 may also be a data-only mobile device that is able to access packet-switched network 30 but not PSTN 20.

2. Exemplary Operation

Figure 2:
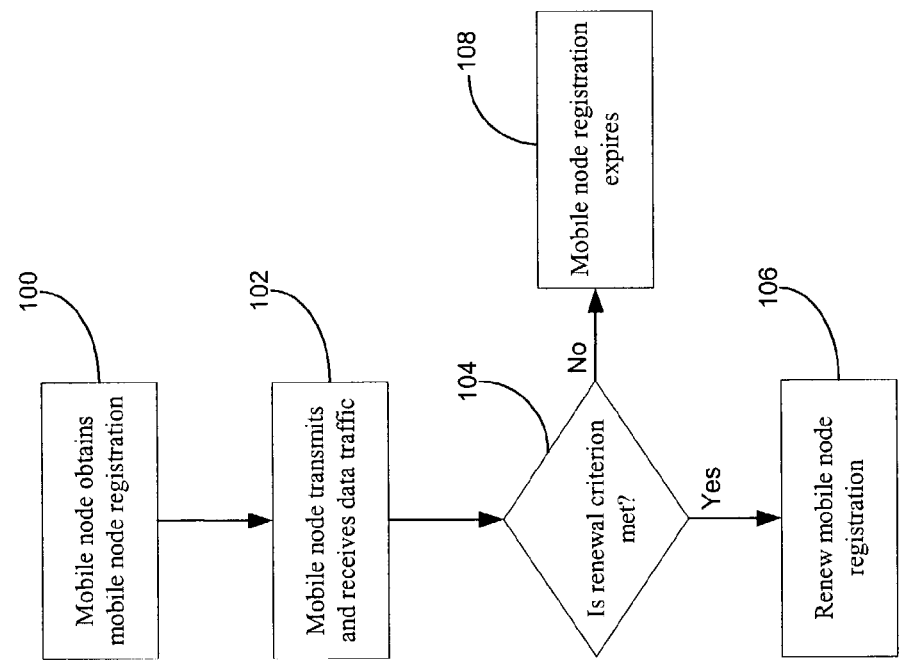
FIG. 2 is a flow chart illustrating, at a high level, a method of mobile node registration management, in accordance with an exemplary embodiment of the present invention.

FIG. 2 is a flow chart illustrating, at a high level, a method of mobile node registration management in accordance with an exemplary embodiment. As indicated by block 100, the process may begin when a mobile node, such as mobile node 14, becomes registered with wireless telecommunications network 10, so that mobile node 14 obtains a mobile node registration. The mobile node registration may be a Mobile IP registration, a Simple IP registration, or some other type of registration with wireless telecommunications network 10. In some cases, wireless telecommunications network 10 may grant the mobile node registration in response to a request from mobile node 14. For example, home agent 44 of wireless telecommunications network 10 may grant the mobile node registration in response to a Mobile IP registration request from mobile node 14. In other cases, wireless telecommunications network 10 may grant the mobile node registration without a specific request from mobile node 14.

Typically, the mobile node registration has only a limited lifetime, i.e., the registration is in effect during a registration time period. In many cases, however, the mobile node registration may be renewed if a renewal criterion is met, as described in more detail below. In particular, if the renewal criterion is met, wireless telecommunications network 10 may grant mobile node 14 a new mobile node registration or extend the existing mobile node registration, so that mobile node 14 may remain registered with wireless communications network 10 for more than one registration time period.

Within the registration time period granted in block 100, mobile node 14 may transmit and receive data traffic, as indicated by block 102. This data traffic may involve communications between mobile node 14 and nodes connected to packet-switched network 30, such as e-mail server 32, web server 34, database 36, SIP registrar 38, and presence server 40. The data traffic may be transmitted over an air interface between BTS 12 and mobile node 14, and BSC/PCF 16 and PDSN 42 may carry the data traffic between BTS 12 and packet-switched network 30.

Some of the data traffic may be user data traffic, i.e., data transmitted or received by the mobile node as a result of user activity or data traffic intended for the user that is received by the mobile node. However, some of the data traffic may be automatic data traffic, i.e., data traffic that occurs automatically. This automatic data traffic may result from applications running on mobile node 14 that perform functions automatically. For example, mobile node 14 may include a SIP user agent client that automatically attempts to register mobile node 14 with SIP registrar 38 whenever mobile node 14 is assigned a Mobile IP address. Thus, the SIP user agent client may generate automatic data traffic during each registration time period, even though the user may not be actively using mobile node 14. In other examples, mobile node 14 may include an application that automatically accesses e-mail server 32 to check for undelivered e-mail messages, an application that automatically synchronizes mobile node 14 with database 36, or an application that automatically registers mobile node 14 with presence server 40.

As noted above, the mobile node registration may be renewed if a renewal criterion is met. Thus, at some point within the registration time period a determination may be made as to whether the renewal criterion is met, as indicated by block 104. This determination may be made by either wireless telecommunications network 10 or by mobile node 14. As described in more detail below, the renewal criterion preferably distinguishes between user data traffic and automatic data traffic.

If the renewal criterion is met, then the mobile node registration is renewed, as indicated by block 106. Renewal of the mobile node registration may involve wireless telecommunications network 10 granting mobile node 14 a new mobile registration with a new registration time period, which may have the same or a different duration than the previous registration time period. Alternatively, renewal of the mobile node registration may involve wireless telecommunications network 10 extending the lifetime of the existing mobile node registration. Either way, mobile node 14 may continue to send and receive data traffic as before.

If the renewal criterion is not met, then the mobile node registration may expire without renewal at the end of the registration time period, as indicated by block 108. As a result of this expiration, wireless telecommunications network 10 may tear down its data link with mobile node 14. In other cases, upon expiration of its registration, mobile node 14 may still keep its data link with wireless telecommunications network 10 and only lose certain functionality.

From the perspective of the user, a mobile node registration may provide mobile node 14 with a certain status or functionality within wireless telecommunications network 10. For example, a mobile node registration may be required to access packet-switched network 30 using either Mobile IP or Simple IP. From the perspective of the wireless telecommunications network, a mobile node registration may require the network to allocate network resources for the mobile node. For example, granting a Mobile IP registration to mobile node 14 may require home agent 44 to allocate to mobile node 14 one of a limited number of dynamic IP addresses available to home agent 44. Similarly, granting a Simple IP registration to mobile node 14 may require PDSN 42 to allocate to mobile node 14 one of a limited number of dynamic IP addresses available to PDSN 42. In addition, hardware and/or software constraints may limit the number of simultaneous connections that network elements, such as PDSN 42 and home agent 44, can maintain. These limited number of simultaneous connections also constitute network resources that wireless telecommunications network 10 may allocate to mobile node 14 when granting it a mobile node registration.

Figure 3:
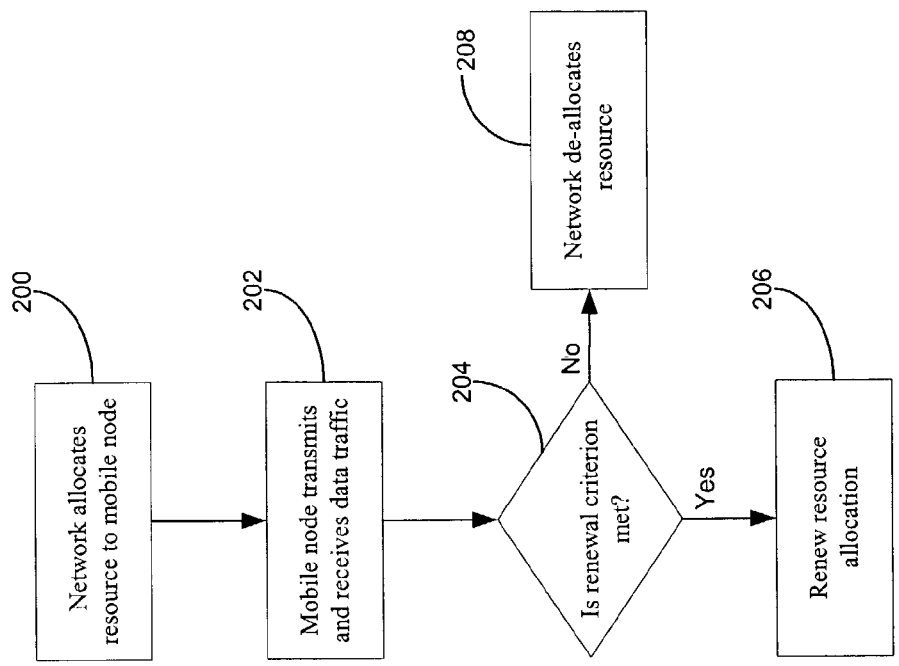
FIG. 3 is a flow chart illustrating, at a high level, a method of network resource management for mobile nodes, in accordance with an exemplary embodiment of the present invention.

Accordingly, the present invention may also provide a method of network resource management. FIG. 3 is a flow chart illustrating, at a high level, a method of network resource management for mobile nodes in accordance with an exemplary embodiment. As indicated by block 200, the process may begin when wireless telecommunications network 10 allocates a network resource to mobile node 14. The network resource may be a dynamic IP address, one of a limited number of connections available to a network element, such as PDSN 42 or home agent 44, or some other limited resource of wireless telecommunications network 10. The resource allocation may, but need not, be associated with a mobile node registration. Typically, the resource allocation has only a limited lifetime, being in effect during a resource allocation time period. In many cases, however, the resource allocation may be renewed, if a renewal criterion is met.

Within the resource allocation time period, mobile node 14 may send and receive data traffic, as indicated by block 202. The data traffic may include user data traffic and automatic data traffic, as described above.

At some point within the resource allocation time period, a determination may be made whether the renewal criterion has been met, as indicated by block 204. Either wireless telecommunications network 10 or mobile node 14 may make this determination.

If the renewal criterion is met, network 10 may renew the resource allocation, as indicated by block 206. Renewing the resource allocation may involve granting a new resource allocation with a new resource allocation time period, which may or may not have the same duration as the previous resource allocation time period. Alternatively, renewing the resource allocation may involve extending the lifetime of the resource allocation time period. The renewed resource allocation may involve an allocation of somewhat different network resources. For example, if the resource is a dynamic IP address, then for the renewed resource allocation network 10 may allocate a different dynamic IP address than before. Renewing the resource allocation may, but need not, be associated with renewing a mobile node registration.

If the renewal criterion is not met, then the resource allocation may expire without renewal at the end of the resource allocation time period. As a result of this expiration, wireless telecommunications network 10 may de-allocate one or more of the resources allocated to mobile node 14, as indicated by block 208. Thereafter, network 10 may make the de-allocated resources available to other mobile nodes. For example, if the resource is a dynamic IP address, then network 10 may assign the dynamic IP address previously assigned to mobile node 14 to a different mobile node. As a result of this resource de-allocation, mobile node 14 may lose its data link with network 10 entirely. In other cases, mobile node 14 may only lose certain functionality.

Figure 4:
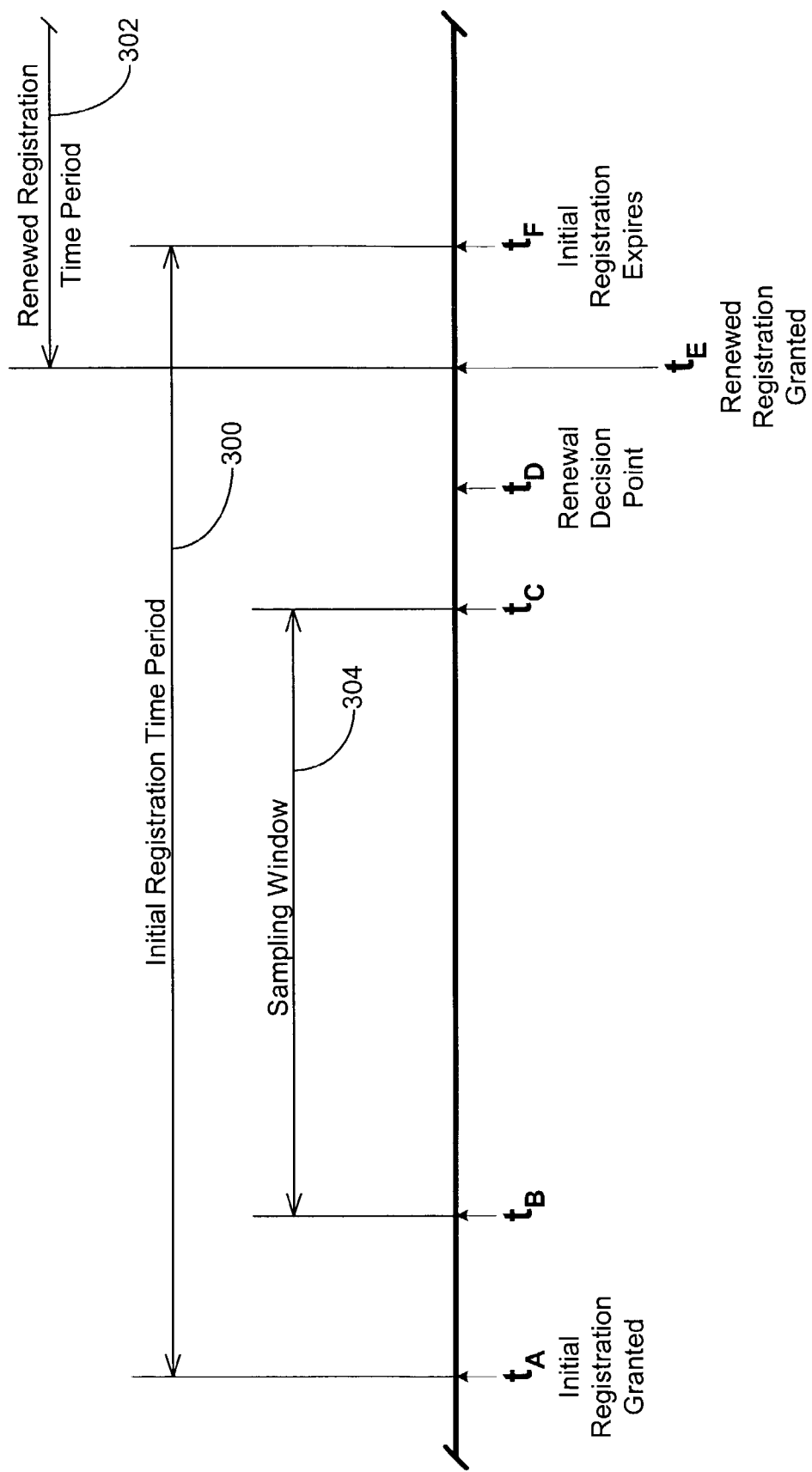
FIG. 4 is a time line illustrating a time sequence of events, in accordance with an exemplary embodiment of the present invention.

FIG. 4 is a time line illustrating a time sequence of events in the method of mobile node registration management illustrated in FIG. 2, in accordance with an exemplary embodiment. The method of network resource management illustrated in FIG. 3 may have a similar time sequence of events.

At time $t_A$, wireless telecommunications network 10 grants mobile node 14 an initial mobile node registration. This initial mobile node registration has an initial registration time period 300 that extends from $t_A$ to $t_F$. The initial mobile node registration may be the first mobile node registration granted to mobile node 14, or it may be part of a sequence of mobile node registrations extending before time $t_A$.

At time $t_D$ within registration time period 300, a decision is made whether to renew the initial registration. The decision whether to renew the initial registration may be based on whether a renewal criterion is met. If the renewal criterion is met, then at time $t_E$ a renewed registration is granted and a renewed registration time period 302 begins. As described in more detail below, the renewal criterion may consider the amount of data traffic that occurs within a sampling window 304 that occurs within registration time period 300. Sampling window 304 extends from a time $t_B$ to a time $t_C$. Although time $t_B$ is shown occurring after time $t_A$ in FIG. 4, these times may coincide. Similarly, although time $t_C$ is shown occurring before time $t_D$ in FIG. 4, these times may also coincide.

3. Renewal Criteria

In preferred embodiments, the present invention may use the resources of the wireless telecommunications network more efficiently by providing one or more renewal criteria that tend to distinguish between user data traffic and automatic data traffic. Such renewal criteria may take a variety of forms. Moreover, the renewal criteria may be applied by either the mobile node or the wireless telecommunications network.

In one overall approach, renewal may require at least a predetermined amount of data traffic, exclusive of data traffic that satisfies predetermined exclusion criteria, to occur within a predetermined time period. The exclusion criteria may be chosen so as to exclude automatic data traffic, thereby tending to distinguish automatic data traffic from user traffic, as described in more detail below. The predetermined time period may be a sampling window within the registration time period, such as sampling window 304 described above. For example, the beginning of the sampling window may or may not coincide with the beginning of the registration time period. Alternatively, the predetermined time period may not be within the current registration time period but may instead extend into previous registration time periods.

In a more specific example, the automatic data traffic may occur within a predictable time period, such as within the first few minutes of each registration time period. Then, to exclude the automatic data traffic, only the data traffic that occurs during a particular sampling window within the registration time period may be considered, with the sampling window chosen to exclude the predictable time period during which automatic data traffic occurs. For example, with reference to FIG. 4, time $t_B$, the beginning of sampling window 304, may be chosen so that the automatic data traffic occurs between $t_A$ and $t_B$ and, thus, does not occur within sampling window 304. In this way, data traffic occurring during the sampling window will tend to be user data traffic rather than automatic data traffic. The renewal criterion would then indicate renewal if a predetermined amount of data traffic occurs during the sampling window. In this way, renewals may be based on user data traffic instead of automatic data traffic.

In another specific example, the data packets that makes up the data traffic may be examined to determine whether they have characteristics of automatic data traffic or characteristics of user data traffic. In particular, characteristics of data packets that are indicative of automatic data traffic or of user data traffic may be identified. One such indicative characteristic may be the TCP or UDP port number of a data packet. In particular, TCP and UDP packets often use particular "well known" port numbers for commonly invoked protocols. Alternatively, protocols may use particular port numbers that are vendor-specific or implementation-specific. In any event, certain port numbers may correspond to protocols that generate automatic data traffic, and other port numbers may correspond to protocols that generate user data traffic. Thus, the port number of data packets may be used to distinguish user data traffic and automatic data traffic.

The payload of a data packet may also be examined for characteristics indicative of automatic data traffic or user data traffic. In particular, different applications may generate different standard headers or identifiers in each packet payload. As a result, particular data sequences, such as strings of text, in the payload may serve as such a distinguishing characteristics. For example, a SIP REGISTER message, which may be part of the automatic data traffic transmitted by a mobile node, may include the text string "REGISTER" at a certain location in the payload. On the other hand, a HyperText Transfer Protocol (HTTP) message, which may be a part of the user data traffic, may include characteristic text in the payload identifying the data packet as an HTTP message. Thus, a data packet may be identified as automatic data traffic or user data traffic based on what appears in its payload.

The criterion may then indicate renewal if a predetermined amount of data traffic with data packets having at least one characteristic, such as a port number or a particular data sequence in the payload, indicative of user data traffic occurs during a predetermined time period. Put another way, data packets having characteristics indicative of automatic data traffic may be excluded from the calculation of the amount of data traffic occurring during the predetermined time period. In this way, renewals will be based on user data traffic.

Another approach is to require a cutoff amount of data traffic for renewal, with the cutoff amount set high enough that the amount of automatic data traffic falls below the cutoff. Thus, the renewal criterion would indicate renewal if at least the cutoff amount of data traffic occurs during a predetermined time period, such as a sampling window within the registration time period. This approach may be preferred if the mobile node transmits a predictable amount of automatic data traffic in each registration time period. The cutoff amount may be set greater than this predictable amount of data traffic. In this way, renewal may be based on user data traffic.

In addition, the cutoff amount may be variable. In particular, the cutoff amount may depend on various factors, such as the time of day, the location of the mobile node, and the identity of the user. In this way, the renewal criterion may be more or less stringent depending on the network load, the level of service the user has subscribed to, or other factors.

The process of determining whether the renewal criterion is met may be performed by an application running on the mobile node, such as mobile node 14. For example, if the mobile node runs an application that initiates renewals, then the renewal criterion may be built into this application. Thus, for the case of mobile node registrations, the renewal criterion may be built into the mobile node's Mobile IP client. In this way, the application would not initiate a renewal unless the renewal criterion was met.

Alternatively, the renewal criterion may be applied by a screening application of the mobile node that screens renewal attempts coming from the Mobile IP client or other renewing application and drops them if the renewal criterion is not met. This approach may be preferred if the mobile node already has a renewing application that cannot be readily altered. For example, the renewing application may be provided as firmware in the mobile node.

In other embodiments, wireless telecommunications network 10 may determine whether the renewal criterion is met. In this approach, mobile node 14 may generate a renewal request without determining whether the renewal criterion is met. Wireless telecommunications network 10 receives the renewal request, and a network element, such as PDSN 42 server analyzes the data traffic corresponding to mobile node 14 to determine whether the renewal criterion has been met. In an exemplary embodiment, PDSN 42 determines whether the renewal criterion is met. PDSN 42 may make this determination based on RADIUS accounting START and STOP records it receives from BSC/PCF 16. If the renewal criterion has been met, then PDSN 42 may allow the renewal request to go through to home agent 44. Otherwise, PDSN 42 may drop the renewal request.

Using wireless telecommunications network 10 to determine whether to renew a mobile node registration or a resource allocation may offer certain advantages. First, it may be easier to provision network 10 to apply the renewal criterion than to provision the mobile nodes, such as mobile node 14, to do so. Second, wireless telecommunications network 10 may apply a renewal criterion that is based on a customer profile. The customer may be identified from a network access identifier (NAI) the mobile node includes in its renewal request. The customer profile may then make the renewal criterion more or less stringent, depending on the level of service the customer has paid for. Thus, at one extreme, the customer profile may allow renewal regardless of the amount of data traffic from the mobile node. At another extreme, the customer profile may disallow renewal regardless of the amount of data traffic from the mobile node. In between these two extremes, the customer profile may define the parameters to apply in the renewal criterion or the type of renewal criterion to apply.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of registration management for a mobile node, said mobile node transmitting and receiving packet data traffic, said method comprising:
    registering said mobile node with a wireless telecommunications network to obtain a mobile node registration, said mobile node registration having a registration time period;
    obtaining a packet data traffic amount by determining how much packet data traffic, exclusive of packet data traffic satisfying at least one exclusion criterion, occurred within a predetermined time period; and
    renewing said mobile node registration if said packet data traffic amount is at least a predetermined amount.

2. The method of claim 1, wherein said at least one exclusion criterion distinguishes between automatic packet data traffic and user packet data traffic.

3. The method of claim 1, wherein packet data traffic satisfies said at least one exclusion criterion by occurring during an exclusion time period.

4. The method of claim 1, wherein packet data traffic satisfies said at least one exclusion criterion by having at least one packet characteristic.

5. The method of claim 1, wherein said predetermined time period is a sampling window within said registration time period.

* * * * *